(12) United States Patent
Nelson

(10) Patent No.: US 6,223,689 B1
(45) Date of Patent: May 1, 2001

(54) NELSON TRAWLERS AQUACULTURE UNIT

(76) Inventor: Gregory John Nelson, 419 N. Washington Ave., Titusville, FL (US) 32796

( * ) Notice: Subject to any disclaimer, the term of this patent is extended or adjusted under 35 U.S.C. 154(b) by 0 days.

(21) Appl. No.: 09/248,244

(22) Filed: Feb. 10, 1999

(51) Int. Cl.$^7$ .................................................. A01K 61/00
(52) U.S. Cl. ...................... 119/234; 119/236; 119/238; 119/239; 119/211
(58) Field of Search .................................. 119/215, 217, 119/208, 207, 236, 238, 239, 211, 221, 204, 223, 234

(56) References Cited

U.S. PATENT DOCUMENTS

| | | |
|---|---|---|
| 463,397 | 11/1891 | Walton, Sr. . |
| 3,196,833 | 7/1965 | Glancy ...................................... 119/4 |
| 3,418,973 | 12/1968 | Saito ......................................... 119/3 |
| 3,653,358 * | 4/1972 | Fremont ................................ 119/223 |
| 3,661,119 | 5/1972 | Sanders .................................... 119/3 |
| 3,709,195 | 1/1973 | Tabb ......................................... 119/2 |
| 3,795,225 | 3/1974 | Ogui ......................................... 119/5 |
| 3,901,190 * | 8/1975 | Wiegardt, Jr. ........................ 119/237 |
| 3,996,894 * | 12/1976 | Wiegardt, Jr. . |
| 3,996,895 * | 12/1976 | Wiegardt, Jr. . |
| 4,014,293 * | 3/1977 | Salter .................................... 119/218 |
| 4,044,720 * | 8/1977 | Fast ....................................... 119/223 |
| 4,182,269 * | 1/1980 | Young, II ............................. 119/218 |
| 4,257,350 * | 3/1981 | Streichenberger .................... 119/223 |
| 4,257,351 | 3/1981 | Scura et al. .............................. 119/4 |
| 4,317,429 | 3/1982 | Leighton et al. ......................... 119/2 |
| 4,742,798 * | 5/1988 | Blackett ................................ 119/218 |
| 4,744,331 * | 5/1988 | Whiffin ................................. 119/223 |
| 4,798,168 * | 1/1989 | Vadseth et al. ....................... 119/223 |
| 4,915,059 * | 4/1990 | Long ..................................... 119/224 |
| 4,972,801 | 11/1990 | Hunt ......................................... 119/3 |
| 5,092,268 | 3/1992 | Taylor ....................................... 119/3 |
| 5,320,068 | 6/1994 | Redditt ................................. 119/226 |
| 5,450,818 * | 9/1995 | Caillouet .............................. 119/223 |
| 5,477,813 * | 12/1995 | Lien ...................................... 119/223 |
| 5,596,947 * | 1/1997 | Creppel et al. ....................... 119/223 |
| 5,762,024 | 6/1998 | Meilahn ................................ 119/223 |
| 5,845,602 * | 12/1998 | Kaarstad et al. ..................... 119/223 |
| 6,024,050 * | 2/2000 | Rheault ................................ 119/238 |

FOREIGN PATENT DOCUMENTS

0146518 * 6/1985 (EP) .

* cited by examiner

*Primary Examiner*—Charles T. Jordan
*Assistant Examiner*—Yvonne R. Abbott
(74) *Attorney, Agent, or Firm*—Brian S. Steinberger; Law Offices of Brian S. Steinberger

(57) ABSTRACT

An aquaculture system for allowing live seafood such as clam seeds to grow on a floatation raft which can be positioned in water dock spaces of a marina. A first embodiment allows for an air source such as a regenerative blower to pump air into airlifts under the floatation raft causing seawater to become aerated to flow into and up through screens in container units in the raft allowing for the live seafood on the screens to become both aerated and fed. A second embodiment is a downwell unit where the aerated water flows down the container units through the screens. The upwell air lifts can be modified with spray arm attachments to convert the system from upwell to downwell flow operations. The airlifts can have forty-five degree angled cut bottoms, and include extension tubes for allowing deeper seawater to be introduced into the system. Removable filters can be attached to the airlifts to filter out undesirable contaminants from the system.

15 Claims, 8 Drawing Sheets

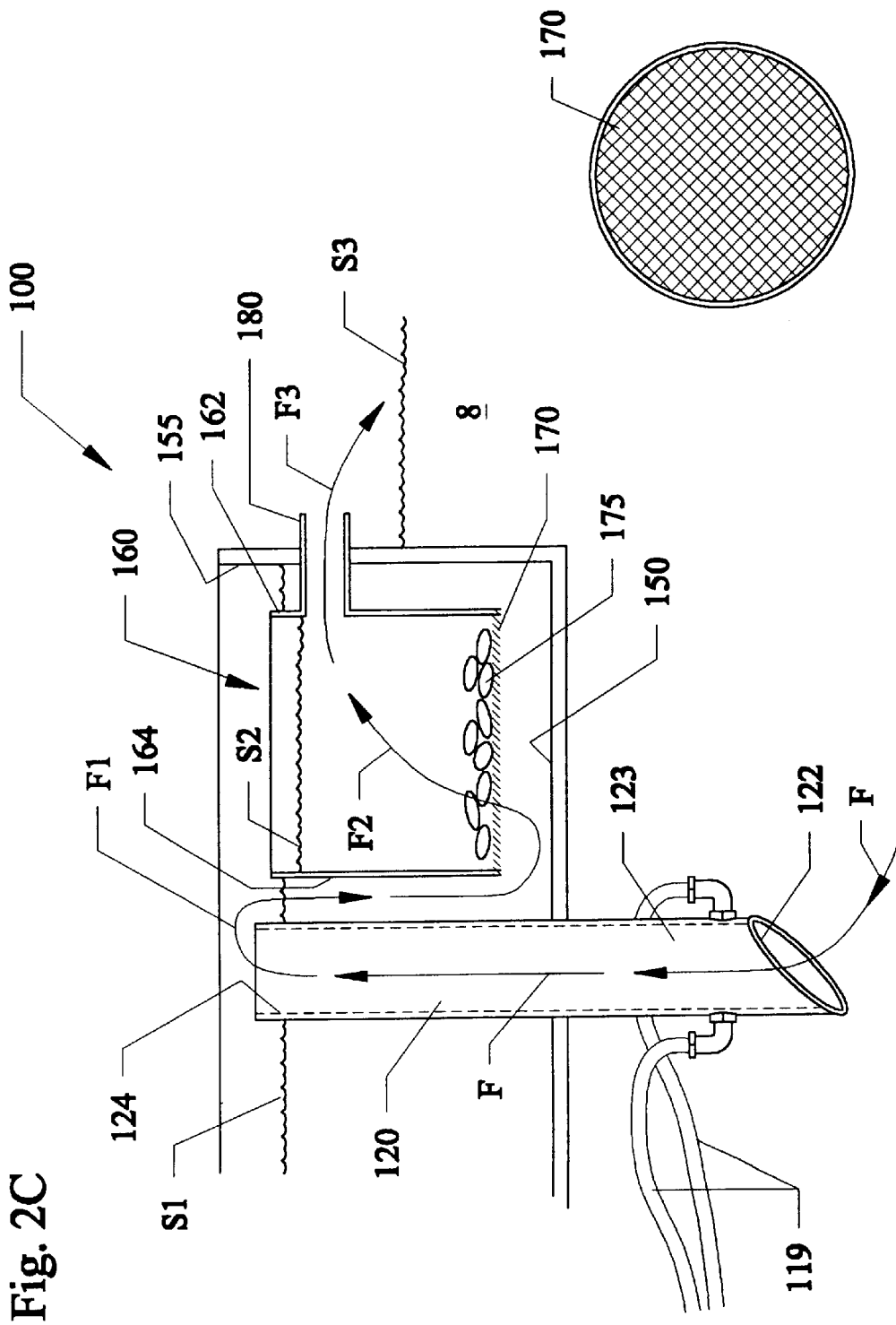

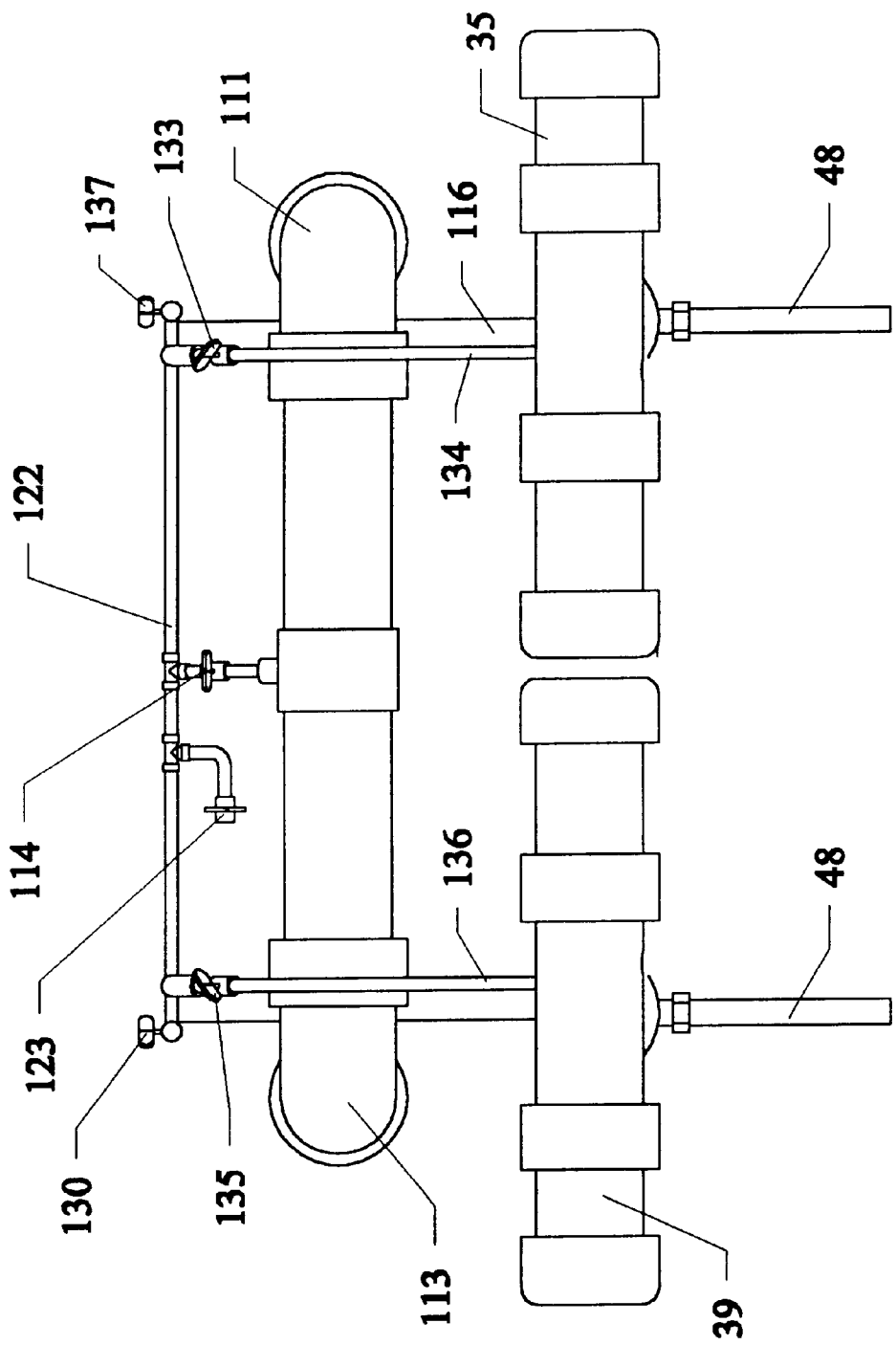

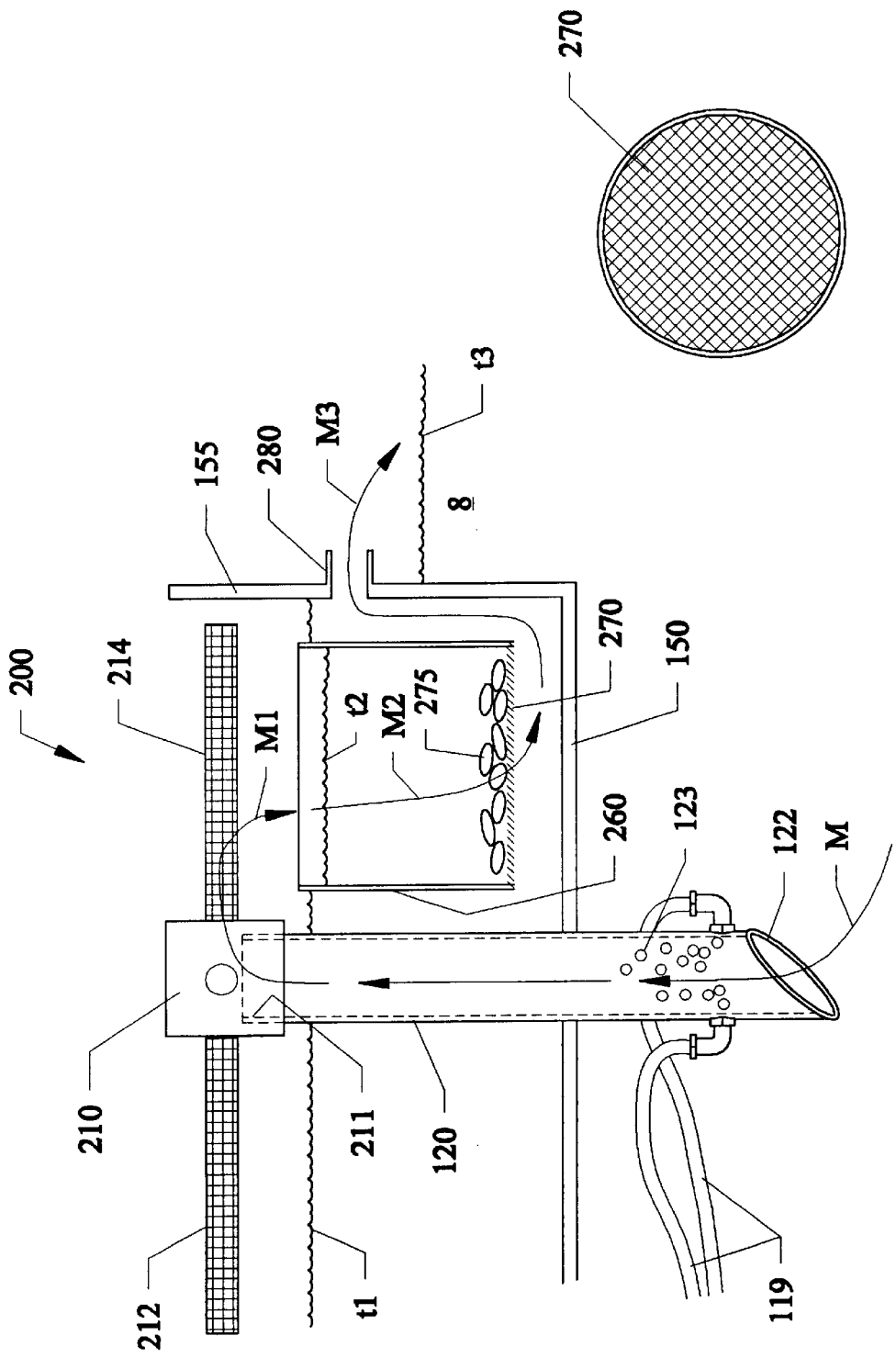

NELSON TRAWLERS AQUACULTURE UNIT

This invention relates to aeration systems for live seafood such as clam seed, and in particular to aeration systems with a floatation box having plural units each having a screened bottom that holds live seafood such as clam seed, fingerling, shell fish, and the like, where seawater is air pumped in either an upwell or a downwell process through the plural units for aerating and washing away waste from the seafood contained in the units.

BACKGROUND AND PRIOR ART

Aquaculture systems have been around for many years. Various devices have been proposed for providing aerating systems for all types of fish. See for example, U.S. Patents 463,397 to Walton; 3,196,833 to Glancy; 3,418,973 to Saito; 3,661,119 to Sanders; 3,709,195 to Tabb; 3,795,225 to Ogui; 4,257,351 to Scura et al.; 4,317,429 to Leighton et al.; 4,972,801 to Hunt; 5,092,268 to Taylor; 5,320,068 to Redditt; and 5,762,024 to Meilahn.

Glancy '833, Saito '973, Sanders '119, Ogui '225, and Hunt '801 each describe various fish tank systems that are generally landlocked and do not allow for the easy use of seawater for aeration purposes, and thus would not provide a good environment for the culture of live seafood such as clam seeds.

Walton, Sr. '397 and Leighton et al. '429 each describe floating panels having screened bottoms but do not describe techniques for aerating any water flow through the screens.

Tabb '195 describes a method for hatching and growing marine organisms using an airpumped floatation raft. However, Tabb '195 requires a separate pump 46 to pump in seawater, and does not aerate the water passing into the enclosed raft and does not provide any screened units for supporting separated culture environments for different sizes of seafood, nor for providing either any upwelling nor downwelling water flows into the enclosed raft.

Meilan '024 describes an aquaculture system wherein seawater can be pumped along with oxygen into a floating aquaculture container. However, Meilan '024 requires both an electric type water pump 30 and a separate oxygen diffuser 58 FIG. 5, the latter of which requires an "oxygen generator or bottles of liquid oxygen. . . (for) injecting the oxygen into pressurized sea water", column 5, lines 12–15. Furthermore, Meilan does not describe being able to raise and lower the floating container with the same air supplies, nor does the system describe both upwelling and downwelling water flow aeration of the seafood.

Redditt '068 describes an "automatic oxygenation system for aquaculture" where oxygenated seawater can be pumped into the floating container. However, Redditt '068 requires both an electric type water pump 190 and separate aerator 175 FIG. 8. Furthermore, Redditt '068 does not describe being able to raise and lower the floating container with the same air supplies, nor does the system describe both upwelling and downwelling water flow aeration of the seafood.

Both Meilan '024 and Reddit '068 require mechanical operating electrically powered pumps that must operate under a constant load while pumping water. These types of pumps generally require extensive maintenance due to their multiple moving parts such as bearings and seals that can fail and need to be replaced. Furthermore, these types of electric pumps generally require power sources to be located in or close to the water locations causing an inherent potential for electrical shock to both workers and the organisms being cultured.

Scura et al. '351 describes a "bivalve production flume", title, with "upwelling" features for seawater cultivation. However, Scura et al. '351 requires elaborate seafloor trenches and complex distribution system, and does not use any floatation boxes nor airpumps for both the upwelling and downwelling operations.

The aeration type systems of the prior art can inherently can create the potential for gas bubble disease by mixing both pressure pumped water and a separate pumped oxygen source.

None of the cited patents individually nor in combination describe a system having the capability of using a airpump to aerate seawater in either an upwell or downwell process within a floatation box holding seafood such as clam seeds, where the box is also floated by the same airpump. into a floatation box unit.

SUMMARY OF THE INVENTION

The first objective of the present invention is to provide an aquaculture system for live seafood having an aeration and air ballast floatation system powered by the same airpump, where the floated box can be raised and lowered for maintenance, and cleaning operations.

The second object of this invention is to provide an aquaculture system for live seafood having an air ballast floatation system powered by an airpump which eliminates the need for any lifting machinery, pumps, nor the addition of costly floating docks.

The third object of this invention is to provide an aquaculture system for live seafood having an aeration system powered by an airpump where an adapter can be used to allow for both upwelling and downwelling operations.

The fourth object of this invention is to provide an aquaculture system for live seafood having an aeration powered airpump with airlift intake that does not rely on mechanical nor separate electric pumps to aerate the water supply.

The fifth object of this invention is to provide an aquaculture system for live seafood having an aeration powered airpump with an adjustable length airlift intake for allowing water from different depths to be pumped into the aquaculture system.

The sixth object of this invention is to provide an aquaculture system for live seafood having an aeration powered airpump that does not operate under a constant load while the aerated water is flowing into the system.

The seventh object of this invention is to provide an aquaculture system for live seafood having an aeration powered airpump that does not require extensive maintenance since the system does not require multiple moving parts such as bearings an seals that can fail and need to be replaced.

The eighth object of this invention is to provide an aquaculture system for live seafood having an aeration powered airpump that does not require electric power supplies located in or close to the water locations eliminating the potential for electrical shock to both workers and the organisms being cultured.

The ninth object of this invention is to provide an aquaculture system for live seafood having an aeration powered airpump that eliminates the potential for gas bubble disease by using only pumped air to transfer water from the ambient water environment to the culture system. The novel systems use a fiberglass floatation box that contains upwelling and downwelling units that contain different sized screens in which the cultured organisms are housed according to the particular growth stage. Water flow is directed into a flotation box by the pumping system directing the flow of water up or down through the screens and out the drains. In order for the downwelling process to be obtained, an adapter is fitted over the upwelling-pumping head. Water is transferred from the ambient water source via airlifts into the upwelling modules. Aerated water travels up through the screen bottom in the upwelling units and is expelled into the ambient water source through side drains. This process increases the water flow rate and aeration of the surrounding water. Smaller upwelling diameters can be utilized to increase the amount of water flow through the well which fluidizes the clam bed allowing maximized flow rates which invigorates the food source and oxygen supply as well as flushing unwanted feces from the system.

Live seafood such as clam seeds can be purchased and placed at a selected density on selected screen sizes in the upwelling units. With the attachment of the downwelling option, clam seed of a much smaller size can be cultivated. Filter attachments and bag filters can be incorporated over downwelling supply tubes filtering ambient water source particles to the downwell. Screens can be fitted over the outlet drains for fin fish culture. The clam seed can be graded and separated by size according to their growth rates and the larger clam seed can be placed on larger mesh screens in separate upwelling units. Clam seeds can be cultivated over several months and grow much quicker using the upwelling and downwelling aerated seawater.

The upwell and downwell module boxes use a self sustaining floatation system that eliminates separate floating docks to secure the units. By removing a large drain plug on the end of the upwelling and downwelling module, the water is evacuated by operating the module ballast tanks by air pressure. The ballast tanks can be used to float the module from a semi-submersed position to a full floating position. With full floatation, maintenance such as washing down the outside of the module and/or making repairs can be accomplished. The module can then be submersed to the operating position by releasing the air from the module ballast tanks. Airlists can then be reactivated and operation of the upwelling or downwelling of the system can 5 continue.

Further objects and advantages of this invention will be apparent from the following detailed description of a presently preferred embodiment, which is illustrated schematically in the accompanying drawings.

BRIEF DESCRIPTION OF THE FIGURES

FIG. 2C is an enlarged view of a single upwell unit of FIGS. 2A-2B showing the upwell water flow through the unit.

FIG. 2D is a top view of a single screen bottom used in the single upwell unit of FIG. 2C.

FIG. 3E is an end view of the floatation collars and ballast tanks of FIGS. 3B and 3C along arrow E.

FIG. 4C is an enlarged view of a single downwell unit of FIGS. 4A–4B showing the downwell water flow through the unit.

FIG. 4D is a top view of a single screen bottom used in the single downwell unit of FIG. 4C.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
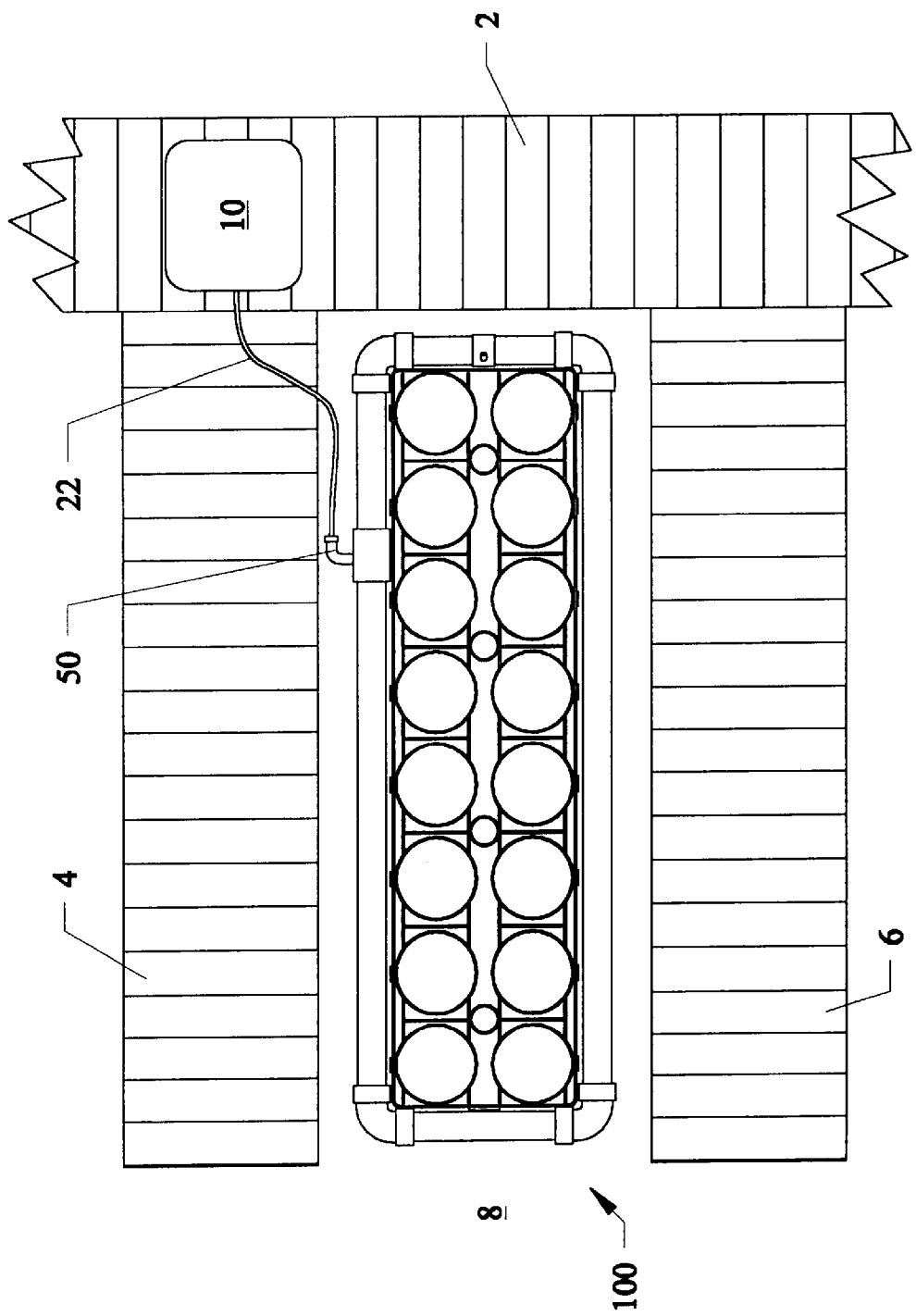
FIG. 1 shows an exemplary top view of using the novel acquaculture invention in seawater.

FIG. 1 shows an exemplary top view of using the novel acquaculture invention 1 in seawater 8. A floatation module 100 such as an upwelling module 100 shown and described in greater detail in reference to FIGS. 2A–2D. Referring to FIG. 1, an air source 10 such as but not limited to a Regenerative Blower Model No. DR454R58 having 1 .5 HP, 115/230 volt, 1 phase 50/60 Hz Tefc, Class F manufactured by Rotron, is connected by airline 22 to module air pressure line connection 50 (shown in FIG. 3C) to raise and lower module 100 from the seawater 8 for maintenance and cleaning using floatation collars and ballast tanks which are described in detail in reference to FIGS. 3A–3D.

Figure 2A:
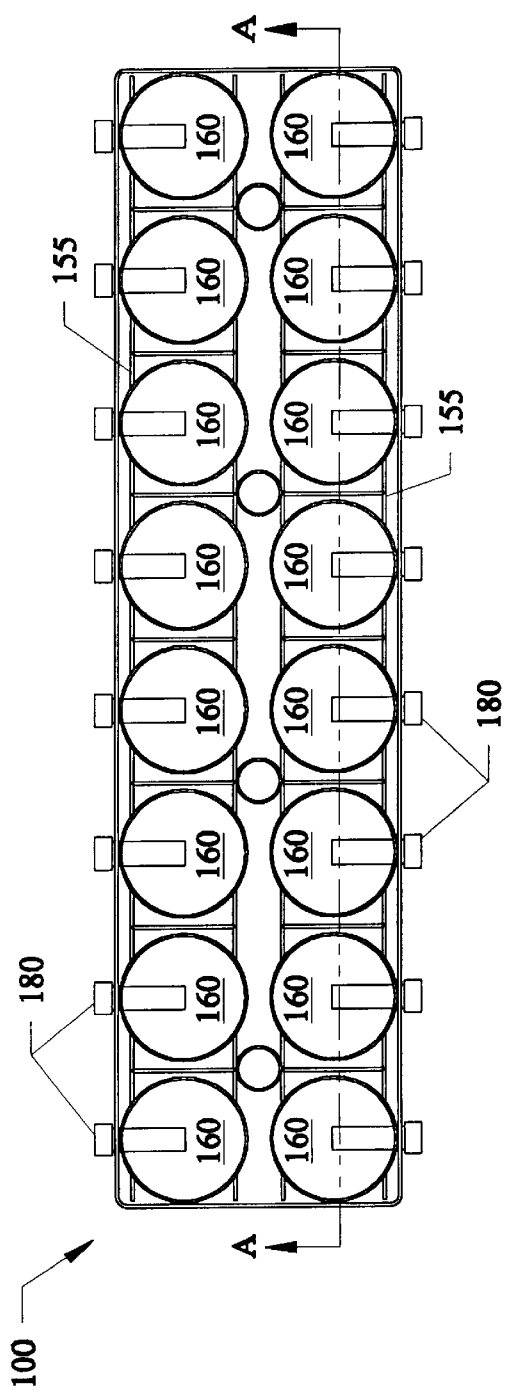
FIG. 2A is a top view of an upwelling embodiment of the floatation module of FIG. 1.
Figure 2B:
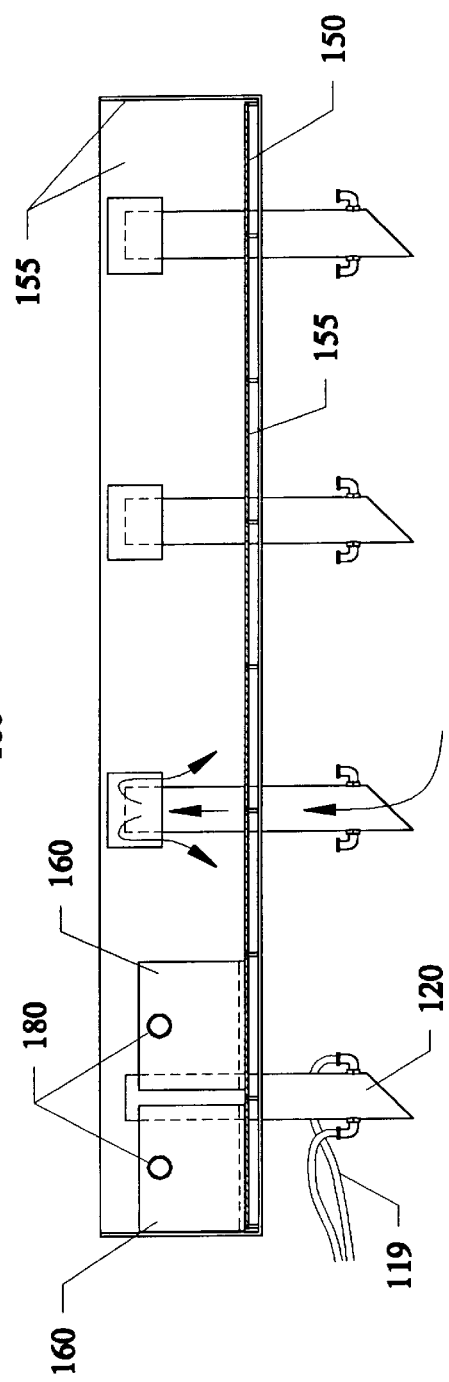
FIG. 2B is a side cross-sectional view of the upwelling embodiment of FIG. 2A along arrow A.

FIG. 2A is a top view of an upwelling embodiment of the floatation module 100 of FIG. 1 with 16 cylindrical container units 160 inside support framework 150, each having external drain pipes 180 of which their use will be explained in relation to FIG. 2C. Frame work 155 can be a open box having side walls and floor each being approximately ½ inch thick plastic, and the like. FIG. 2B is a side cross-sectional partial cut-away view of the upwelling embodiment 100 of FIG. 2A along arrow A, which more clearly shows the position of the PVC airlifts 120 which pass from beneath the framework bottom 150 to inside and within the framework walls 155.

FIG. 2C is an enlarged view of a single upwell unit 160 of FIGS. 2A–2B showing the upwell water flow through the unit 160 inside the floating framework 150, 155 of module 100 which is floating in seawater 8. Air is pumped through air supply lines 119 from the air control valves shown in more detail in reference to FIGS. 3A–3D, and the regenerative blower air supply source 10 shown in FIG. 1, to the inside of hollow air lift 120 above 45 degree cut open end 122. The pumped in air 123 causes aerated seawater to be pulled up in the direction of arrow F through hollow vertical airlift 120 to exit at the top open end 124 and overflow into the framework 155 to first surface level S1. Unit 160 is elevated above floor 150 which allows the aerated seawater to pass upwell through the bottom screen 170 of unit 160 and about the seafood 175 that is lying over the screen 170. The aerated seawater both aerates the live seafood 175 and passes out 3 inch drain 180 to the outside seawater 8. Note that the water height S1 in the closed framework 155 is higher than the water height S2 in the individual unit 160 which in turn is higher than the exterior seawater surface height S3, thus allowing the water flow F to overflow at F1 and pass through bottom unit screen 170 as shown by F2 and out drain at F3.

FIG. 2D is a top view of a single screen bottom used in the single upwell unit 160 of FIG. 2C. Each screen 170 can be formed from mesh stainless steel, plastic, combinations thereof, and the like. Unit 160 can each be approximately 12 inches high and have an inner diameter of approximately 18 inches and be formed from PVC, and the like. The subject invention can be used for growing live seafood such as clam seeds and the like. The following Table 1 illustrates the different size clam seeds, the amounts and screen/mesh openings that can be used for cultivation.

TABLE 1

| Clam Size In millimeters | Number of Seeds | Screen opening sizes in millimeters |
|---|---|---|
| 1.6 to 4.99 | approximately 150,000–250,00 | 1 |
| 5 to 8 | approximately 10,000–150,000 | 2.5 |
| 9 to 16 | up to 10,000 | 4 |

Figure 3A:
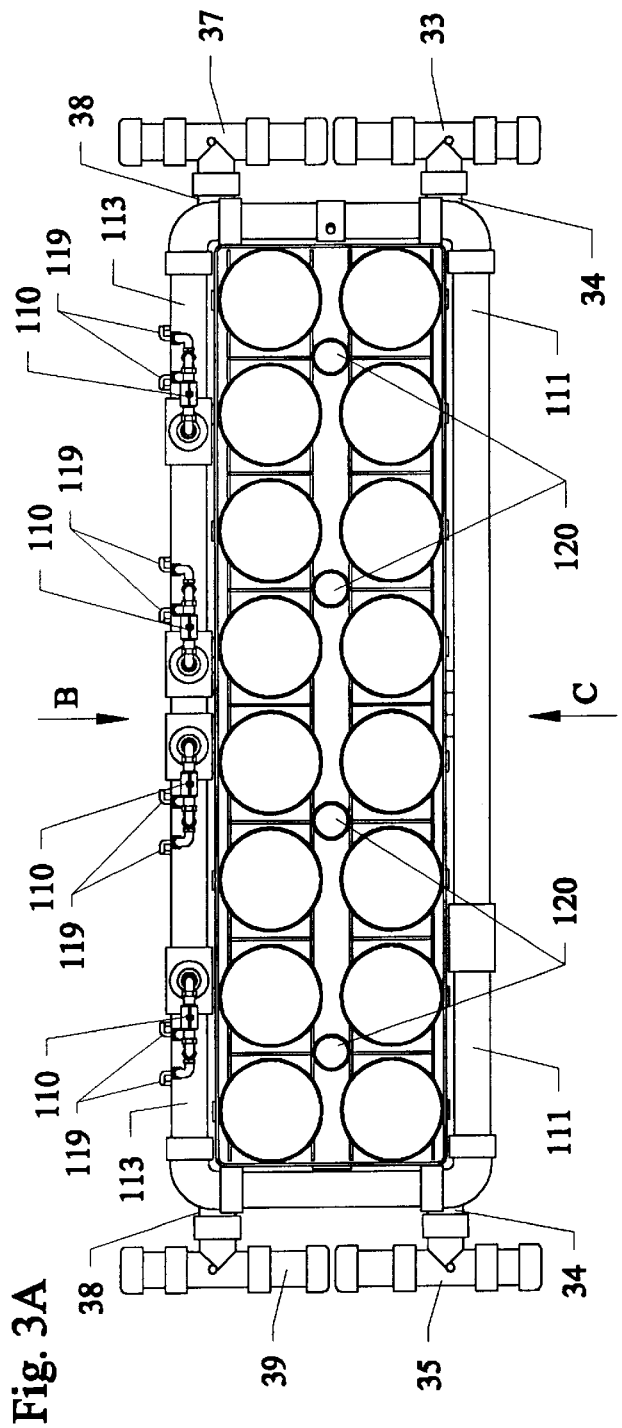
FIG. 3A is a top view of the floatation collars and ballast tanks used to raise and lower the floatation module of the preceding figures.
Figure 3B:
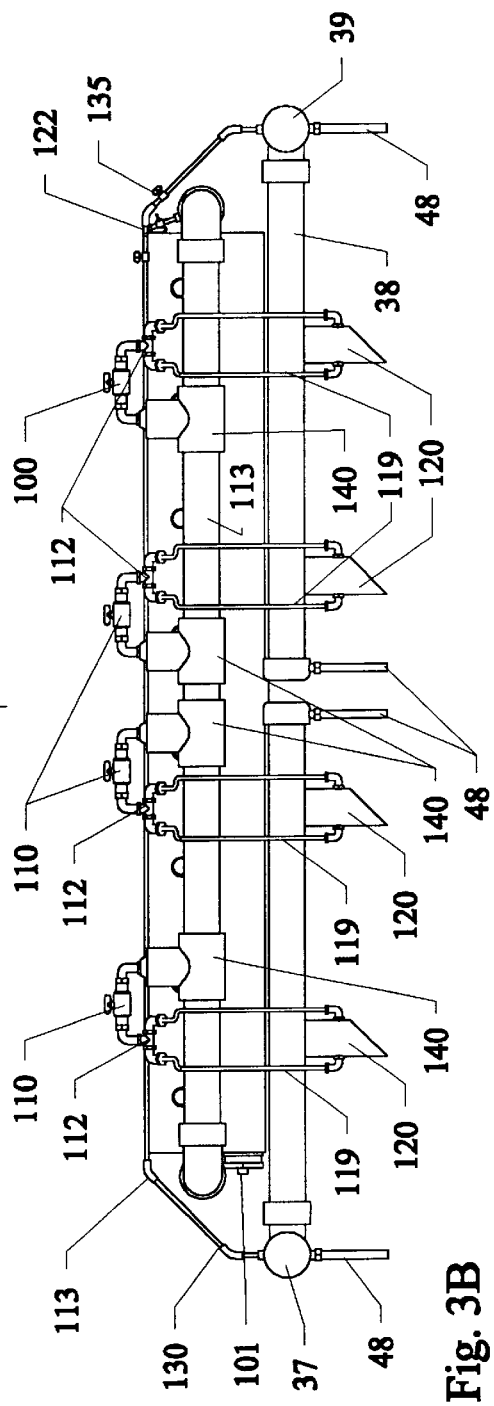
FIG. 3B is a side view of the floatation collars and ballast tanks of the floatation module of FIG. 3A along arrow B.
Figure 3C:
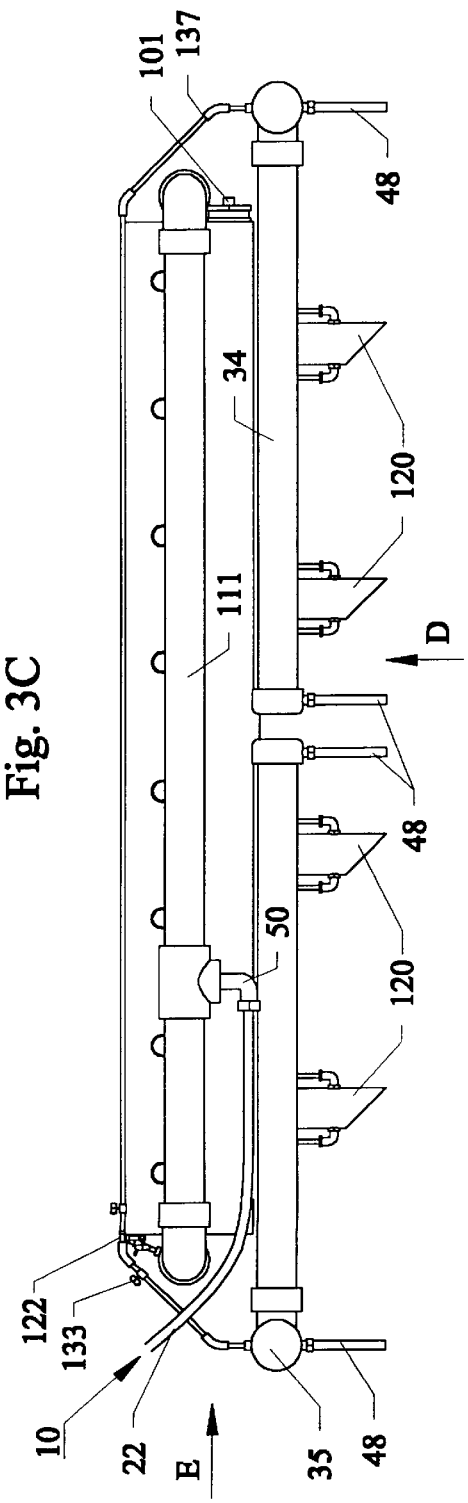
FIG. 3C is another side view of the floatation collars and ballast tanks of the floatation module of FIG. 3A along arrow C.
Figure 3D:
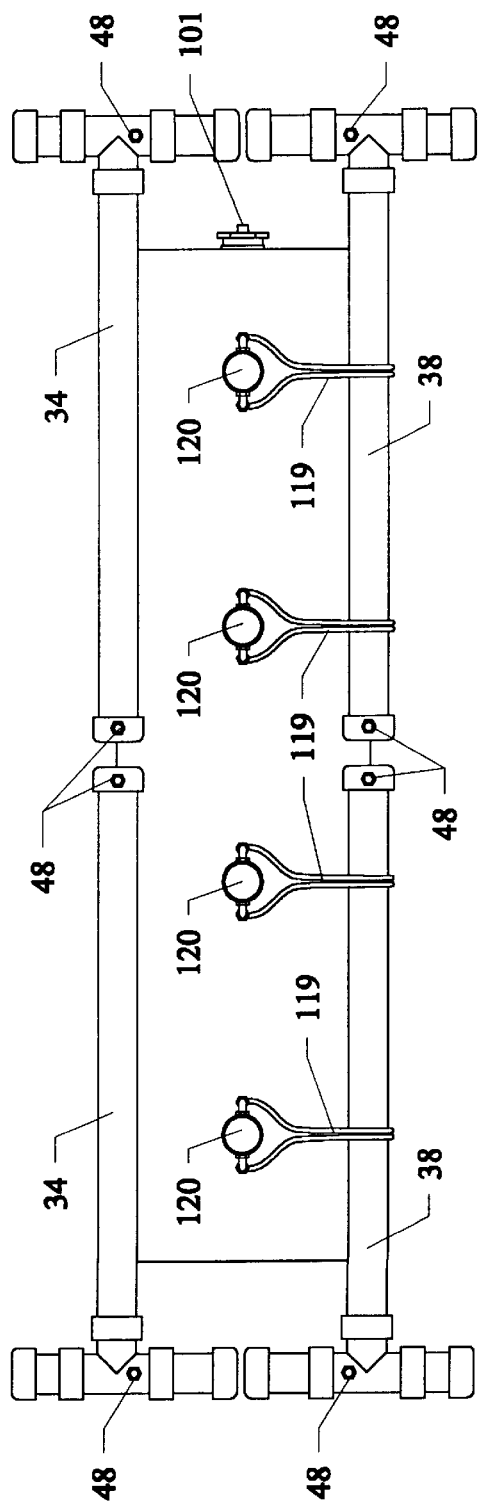
FIG. 3D is a bottom view of the floatation collars and ballast tanks of the floatation module of FIG. 3C along arrow D.

FIG. 3A is a top view of the floatation collars and ballast tanks used to raise and lower the floatation module of the preceding figures. FIG. 3B is a side view of the floatation collars and ballast tanks of the floatation module of FIG. 3A along arrow B. FIG. 3C is another side view of the floatation collars and ballast tanks of the floatation module of FIG. 3A along arrow C. FIG. 3D is a bottom view of the flotation collars and ballast tanks of the floatation module of FIG. 3C along arrow D. FIG. 3E is an end view of the floatation collars and ballast tanks of FIGS. 3B and 3C along arrow E.

Referring to FIGS. 3A–3E, 110 refers to a ½ inch air control valves, 120 refers to a 6 inch wide PVC air lifts, 130 refers to a ¾ inch PVC air ballast line for port ballast control/valve, 140 refers to a 6 inch Tee, air pressure distribution manifold, 50 refers to a 3 inch air pressure line connection, 135 refers to a ¾ inch PVC air ballast line, port forward control/valve, 34 and 38 refer to submersion/flotation ballast tanks, 37 is port aft tank and 39 is port forward tank, 33 is starboard aft tank and 35 is starboard forward tank, 48 refers to an exhaust/flood ballast tank tubes, 119 refers to an air supply line from air pressure manifold to air lift, 101 refers to a 6 inch PVC drain fitting cap, 111 and 113 refer to a 6 inch PVC air pressure manifold floatation collars, 112 refers to a 1&½ inch PVC to ¾ inch PVC air distribution splitter, 114 refers to air pressure supply valve to control manifold 122, 116 refers to welling module tank, 122 refers to air pressure/vent manifold line, 123 refers to air pressure vent valve, 133 refers to a ¾ inch PVC air ballast line with starboard forward ballast control/valve, 134 refers to air supply line/vent line starboard forward ballast/flotation tank, 136 refers to air supply line/vent line port forward ballast/flotation tank, and 137 refers to a ¾ inch PVC, air ballast line and starboard aft ballast control/valve.

The raising of the flotation module 100 in FIGS. 3A–3E will now be described in the following ten (10) steps.
(1) Remove six inch drain plug 101.
(2) Close valve 123.
(3) Open valve 112.
(4) Open valves 133 and 135.
(5) Flotation tubes/tanks 38, 39 and 34, 35 fill with air, ballast water is expelled through exhaust/flood ballast tank tubes 48.
(6) Flotation module manifold end (FIG. 3E) rises tilting internal water to drain plug end 101.
(7) Outward flow of water from drain plug 101 ceases.
(8) Close valves 135 and 133.
(9) Open valves 130 and 137 to fill aft ballast tubes/tanks 33 and 37 with air.
(10) Aft end of tank 33, 37 begins to rise to same level as front of tank 35, 39 expelling remainder of water in flotation module 100 out drain plug 101.

The lowering of the flotation module 100 in FIGS. 3A–3E will now be described in the following fifteen(15) steps.
(1) Air pressure valve 112 is closed.
(2) Supply/vent valves 130 and 137 are opened.
(3) Valves 133 and 135 are closed.
(4) Vent valve 123 is opened.
(5) Air expels from valve 123 as water floods aft ballast tubes 33, 37 through exhaust/flood ballast tank tubes 48.
(6) Module 100 tilts toward drain plug 101 opening and begins to submerse on aft end while water floods in through drain plug 101.
(7) Air stops venting through valve 123 during complete flooding of aft ballast/flotation tubes/tanks 33, 37.
(8) Valves 130, 137 and vent valve 123 are left in open positions.
(9) Valves 133 and 135 are opened.
(10) Air begins venting from vent valve 123 as air expels from front ballast/flotation tanks/tubes 35, 39.
(11) Air stops venting from vent valve 123 until there is a complete flooding of ballast flotation tank/tubes 35, 39.
(12) Tank 100 has settled into surrounding ambient water until flotation collars 111, 113 sit on the water.
(13) Vent valve 123 is then closed.
(14) Pressure valve 112 is opened, and valves 130, 137, 133, and 135 are selectively opened if the module 100 needs to be leveled and trimmed.
(15) Air lift control valves 110 are then opened feeding air through air lift lines 119 to airlifts 120 to begin pumping action air back into welling module tank units 160 in order to proceed with upwelling and downwelling operations.

Figure 4A:
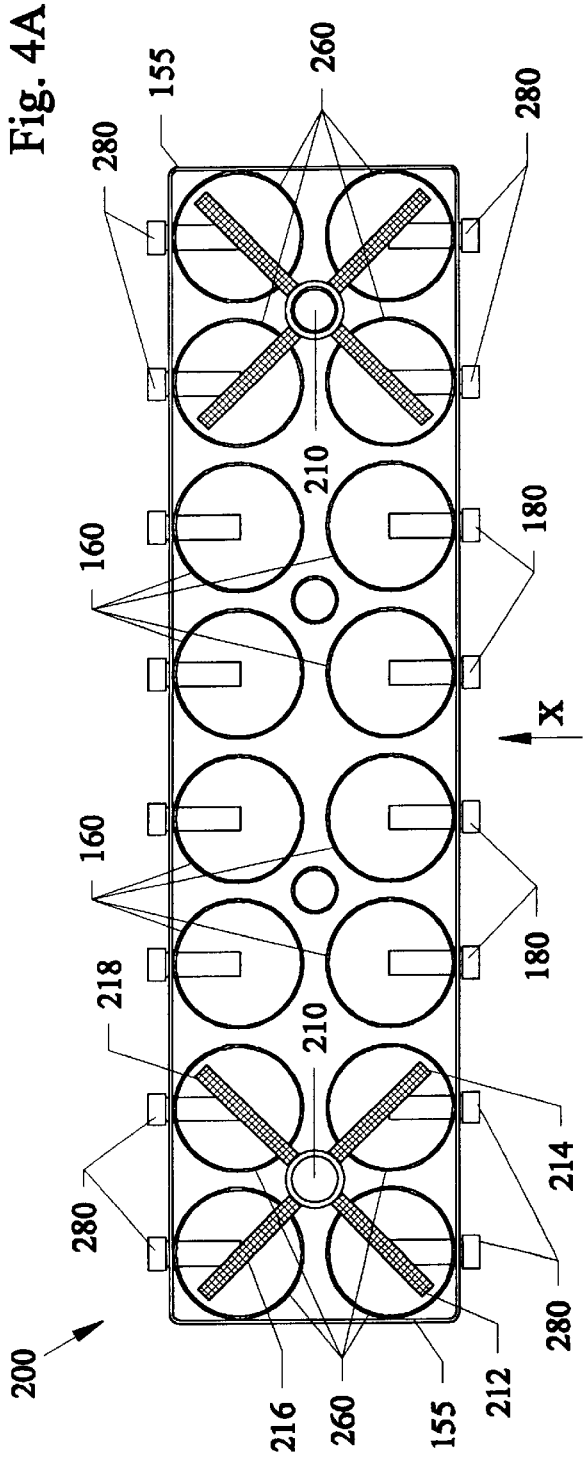
FIG. 4A is a top view of a second embodiment of the upwelling embodiment of FIGS. 2A–2D modified with a spray arm attachment to convert the system to a downwell operation.
Figure 4B:
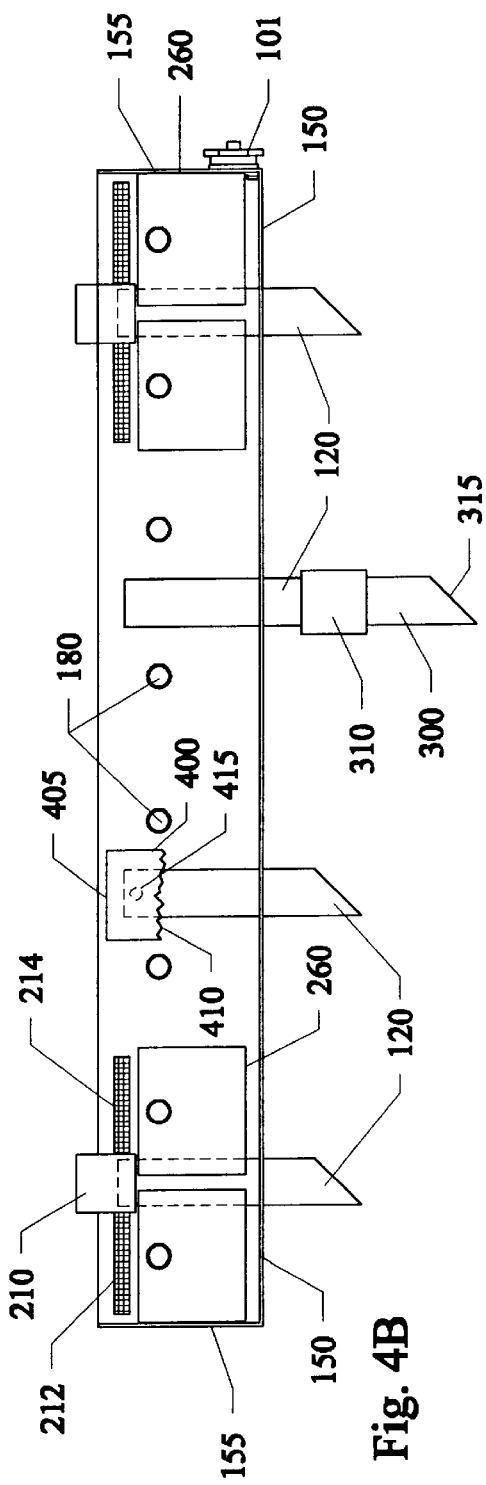
FIG. 4B is a side view of the second embodiment of FIG. 4A along arrow X.

FIG. 4A is a top view of a second embodiment 200 of the upwelling embodiment of FIGS. 2A–2D modified with a spray arm attachment 210 to convert the system to a downwell operation. FIG. 4A shows that both downwell and upwell flow systems can be used simultaneously in the same flotation module. FIG. 4B is a side view of the second embodiment 200 of FIG. 4A along arrow X. FIG. 4C is an enlarged view of a single downwell unit 260 of FIGS. 4A–B showing the downwell water flow through the unit. FIG. 4D is a top view of a single screen bottom 270 used in the single downwell unit 260 of FIG. 4C.

Referring to FIGS. 4A–D, a spray arm mount attachment 210 having a central bottom open end 211 can be fit over the upper opening to airlift 120 by conventional fastening such as internal threads, bolts, and the like. Spray mount attachment 210 can have up to four spray arms 212, 214, 216, 218 that extend outward therefrom having through-holes therethrough. Each well unit 260 is cylindrical to unit 160 previously described, except unit 260 does not have side outlets. Instead separate outlet pipes 280 are only mounted in the sidewalls of frame 155. Unit 260 has a screened bottom 270 on which live seafood 275 such as clam seed can be supported. Ambient seawater can flow into the bottom 45 degree angled cut opening of airlift 120 in the direction of arrow M and be aerated by airsupply bubbles 123 as described in the previous embodiment. The attachment mount 210 directs the aerated seawater to through each of the arms 212, 214, 216, 218 and into the upper open end of each unit 260 as shown by arrow M1. The aerated seawater flows downwell though the live seafood 275 through screen 270 in the direction of arrow M2 up the side of the frame 155 to exit out side exit port 280 into the ambient sea 8. Note the water level t1 inside of frame 155 is lower than the water level t2 inside each well unit 260, and the exterior seawater 8 has the lowest water level t3.

The following Table 2 illustrates the different size clam seeds, the amounts and screen/mesh openings that can be used for cultivation in the downwelling embodiment using well units 260 that are each 12" deep.

TABLE 2

| Clam Size In millimeters | Number of Seeds | Screen opening sizes in microns | Well Unit Diameter |
| --- | --- | --- | --- |
| Less than 1 | approximately 2,000,000 | approximately 250 | 24" |
| 1 to 1.1 | approximately 1,000,000 | approximately 500 | 24" |
| greater than 1.1 | approximately 250,000 | approximately 800 | 18" |

Referring to FIG. 4B a separate filter cover 400 can be attached by conventional fasteners 415 such as but not limited to threads, bolts, and the like, to the upper opening of each airlift 120 and include a closed top 405 and a screened bottom 410 which can be used to screen out undesirable contaminants such as debris, and the like from the aerated seawater entering into the system. An optional extension pipe 300 having a forty five degree angled cut bottom 315 can be slipped over the existing bottom end of airlift 120 by threads and the like, in order to allow deeper seawater such as deep coldwater to be brought into the system.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An aquaculture system for live seafood comprising:
   a floatation module containing live seafood;
   an aerated water source for flowing into the floatation module; and
   an airpump for providing both ballast to the floatation module and for supplying air to the aerated water source, wherein the aquaculture system provides aerated water to the live seafood without using a separate powered water pump, the floatation module having a downwell unit with a container, an upper opening a bottom opening, and a screen for supporting the live seafood therein, where the aerated water source flows from the upper opening down into the container through the screen to exit from the bottom opening of the container and out of the module.

2. An aquaculture system for live seafood comprising:
   a floatation module containing live seafood;
   an aerated water source for flowing into the floatation module; an airpump for providing both ballast to the floatation module and for supplying air to the aerated water source, wherein the aguaculture system provides aerated water to the live seafood without using a separate powered water pump, wherein the floatation module has
   an upwell unit with a container and an upper opening, a bottom opening, and a screen for supporting the live seafood therein, where the aerated water source flows from the bottom opening up through the screen to exit from the upper opening of the container and out of the module.

3. An aquaculture system for live seafood comprising:
   a floatation module containing live seafood;
   an aerated water source for flowing into the floatation module; and
   an airpump for providing both ballast to the floatation module and for supplying air to the aerated water source, wherein the aquaculture system provides aerated water to the live seafood without using a separate powered water pump, wherein the aerated water source includes:
      an airlift tube positioned under the floatation module having the airpump connected thereto, wherein airbubbles from the airpump both aerate ambient water and cause the water to flow into the floatation module.

4. The aquaculture system of claim 3, wherein airlift tube further includes:
   an extension pipe for gathering water from greater depths below the floatation module.

5. The aquaculture system of claim 3, wherein the air lift tube further includes at least one of:
   an approximate 45 degree angled cut bottom end opening, a removable filter covering an upper opening of the tube for filtering the ambient water, and a conversion mount for attachment to an upper opening of the tube to allow the system to be changed from an upwell flow to a downwell flow operation.

6. The aquaculture system of claim 5, wherein the conversion mount further includes:
   a spray arm.

7. An aquaculture system for live seafood comprising:
   a floatation module containing live seafood;
   an aerated water source for flowing into the floatation module; and an airpump for providing both ballast to the floatation module and for supplying air to the aerated water source, wherein the aguaculture system provides aerated water to the live seafood without using a separate powered water pump, wherein the aerated water source includes:
      a ground based regenerative blower for supplying air.

8. An aquaculture system for live seafood comprising:
   a floatation module containing live seafood;
   an aerated water source for flowing into the floatation module; and
   an airpump for providing both ballast to the floatation module and for supplying air to the aerated water source, wherein the aguaculture system provides aerated water to the live seafood without using a separate powered water pump, wherein the flotation module further includes:
      forward and aft ballast tanks; and
      valve controls connected to the forward and the aft ballast tanks for allowing forward and aft ends of the flotation module to be raised and lowered for maintenance to the system.

9. The aquaculture system of claim 8, wherein the flotation module further includes:
   an upper flotation collar about the flotation module above the forward and the aft ballast.

10. An aquaculture system for downwelling aerated water through live seafood comprising:

a platform having a downwell unit container, the container having an upper opening, a bottom opening, and a screen for supporting live seafood;

an aerated water source for flowing into the platform; and an airpump for supplying air to the aerated water source, wherein the aerated water source flows from the upper opening down into the container through the screen to exit from the bottom opening of the container and out of the platform, wherein the aerated water source includes;

a ground sound based regenerative blower for supplying air.

11. An aquaculture system for upwelling aerated water through live seafood comprising:

a platform having an upwell unit container, the container having an upper opening, a bottom opening, and a screen for supporting the live seafood;

an aerated water source for flowing into the platform;

an airpump source for supplying air to the aerated water source, wherein the aerated water source flows from the bottom opening up through the horizontal screen to exit from the upper opening of the container and out of the platform; and an exit drain which drains from the platform above and into a water basin adjacent to the platform.

12. The aquaculture system of claim 11, where the aerated water source includes:

a ground based regenerative blower for supplying air.

13. The aquaculture system of claim 11, further comprising:

a conversion mount on the platform to allow the system to be changed from an upwell flow to a downwell flow operation.

14. The aquaculture system of claim 13, wherein the conversion unit furthers includes: a spray arm.

15. An aquaculture system for downwelling aerated water through live seafood comprising:

a platform having a downwell unit container, the container having an upper opening, a bottom opening, and a screen for supporting live seafood;

an aerated water source for flowing into the platform;

an airpump for supplying air to the aerated water source, wherein the aerated water source flows from the upper opening down into the container through the screen to exit from the bottom opening of the container and out of the platform; and an exit drain which drains from the platform above and into a water basin adjacent to the platform.

* * * * *